United States Patent [19]

Khan

[11] Patent Number: 5,211,723
[45] Date of Patent: May 18, 1993

[54] PROCESS FOR REACTING PUMPABLE HIGH SOLIDS SEWAGE SLUDGE SLURRY

[75] Inventor: Motasimur R. Khan, Wappingers Falls, N.Y.

[73] Assignee: Texaco Inc., White Plains, N.Y.

[21] Appl. No.: 762,205

[22] Filed: Sep. 19, 1991

[51] Int. Cl.$^5$ .................... C10J 3/46; C02F 11/06
[52] U.S. Cl. ................. 48/197 R; 48/197 A; 48/206; 48/209; 48/DIG. 7; 110/341; 110/346; 110/347; 210/758; 252/373
[58] Field of Search ............... 48/197 R, 20 E, 197 B, 48/206, 209, DIG. 7; 44/605, 280, 281, 282; 202/373; 210/769, 779, 603, 761, 758, 764; 110/341, 342, 346, 347, 348; 60/39.02

[56] References Cited

U.S. PATENT DOCUMENTS

| | | | |
|---|---|---|---|
| 3,232,728 | 2/1966 | Reynolds | 48/215 |
| 3,507,788 | 4/1970 | Cole et al. | 210/63 |
| 3,524,630 | 8/1970 | Marion | 261/76 |
| 3,544,291 | 12/1970 | Schlinger et al. | 48/206 |
| 3,687,646 | 8/1972 | Brent et al. | 48/209 |
| 3,847,564 | 11/1974 | Marion et al. | 48/95 |
| 4,052,176 | 10/1977 | Child et al. | 55/32 |
| 4,443,230 | 4/1984 | Stellaccio | 48/DIG. 7 |
| 4,525,175 | 6/1985 | Stellaccio | 48/86 |
| 4,762,527 | 8/1988 | Beshore et al. | 49/605 |
| 4,801,307 | 1/1989 | Muenger et al. | 48/69 |
| 4,933,086 | 6/1990 | McMahon et al. | 48/197 A |
| 4,983,296 | 1/1991 | McMahon et al. | 48/197 A |

FOREIGN PATENT DOCUMENTS

| | | | |
|---|---|---|---|
| 3046146 | 7/1982 | Fed. Rep. of Germany | 210/769 |
| 63-283799 | 11/1988 | Japan | 210/769 |

OTHER PUBLICATIONS

Perry's Chemical Engineers' Handbook, McGraw-Hill, Fourth Edition, 1963, pp. 19-50.

*Primary Examiner*—Peter Kratz
*Attorney, Agent, or Firm*—James J. O'Loughlin; Albert Brent

[57] ABSTRACT

This invention relates to a novel pumpable sewage sludge fuel and process for burning it. An aqueous slurry of sewage sludge is dewatered and dried to a solids content in the range of about 50 to 99 wt. % in a drying zone in the absence of free-oxygen containing gas but while in contact with a gaseous material selected from the group consisting of $N_2$, $CO_2$, $H_2$, CO, and mixtures thereof. The dried sewage sludge is mixed with a supplementary fuel from the group consisting of solid carbonaceous fuel, liquid hydrocarbonaceous fuel, mixtures thereof, and optionally with water to produce a pumpable slurry fuel feedstream having a solids content in the range of about 50 to 65 wt. % and a higher heating value of at least about 6,000 Btu/lb. The slurry fuel feedstream may be burned in a partial oxidation gasifier, furnace, boiler, or incinerator.

8 Claims, No Drawings

PROCESS FOR REACTING PUMPABLE HIGH SOLIDS SEWAGE SLUDGE SLURRY

FIELD OF THE INVENTION

This invention relates to a process for producing pumpable slurries of sanitary sewage sludge for use as fuel in a partial oxidation gas generator, furnace, or boiler.

Treatment of sewage sludge is discussed in coassigned U.S. Pat. No. 3,507,788. Sewage sludge is gasified in a partial oxidation process described in coassigned U.S. Pat. No. 3,687,646. Upgrading aqueous slurries of sewage sludge by shearing without heating is described in coassigned U.S. Pat. No. 4,933,086. Agglomerating the organic matter in aqueous slurries of sewage sludge by heating, is described in coassigned U.S. Pat. No. 4,983,296. However, none of these references taken singly or in combination, teach or suggest the subject invention by which dewatered and ground sewage sludge is dried in the absence of free-oxygen but while in contact with a gaseous material selected from the group consisting of $N_2$, $CO_2$, $H_2$, $CO$ and mixtures thereof. By this means, pumpable slurries of the dried sewage sludge with water and at least one material from the group consisting of coal, petroleum coke, liquid hydrocarbonaceous fuel, and mixtures thereof may be produced having a high solids content. The pumpable slurry may be burned as fuel in a partial oxidation gasifier, furnace, boiler, or incinerator.

SUMMARY OF THE INVENTION

This invention pertains to an improved process for burning sanitary sewage sludge comprising:

(1) dewatering without heating in air an aqueous slurry of sewage sludge having a solids content of at least 3 wt. % to produce an aqueous slurry of sewage sludge having a solids content in the range of about 10 to 50 wt. %;

(2) drying the sewage sludge from (1) to a solids content in the range of about 50 to 99 wt. % in a drying zone in the absence of a free-oxygen containing gas but while in contact with a gaseous material selected from the group consisting of $N_2$, $CO_2$, $H_2$, $CO$, and mixtures thereof; wherein said drying zone is at a temperature in the range of about 210° F. to 350° F. and a pressure in the range of about 0.5 to 5 atmospheres;

(3) mixing said dried sewage sludge from (2) with at least one supplementary fuel from the group consisting of solid carbonaceous fuel, liquid hydrocarbonaceous fuel, mixtures thereof, and optionally with water, to produce a pumpable slurry fuel feedstream having a solids content in the range of about 50 to 65 wt. % and a higher heating value of at least about 6,000 Btu/lb; and (4) burning said pumpable slurry from (3) in a partial oxidation gasifier, furnace, boiler, or incinerator to produce an effluent gas stream.

In a preferred embodiment to avoid contaminating the environment, the effluent gas stream is cleaned and purified and non-contaminating fly-ash and slag are separated from the stream of gases.

DESCRIPTION OF THE INVENTION

Sewage sludge is a heterogeneous mixture of complex organic and inorganic materials. The term "sewage sludge" as used herein may be broadly defined as "water-carried wastes", particularly from municipal sanitary sewage lines, containing at least one of the following: body water (excreta), household wastes, community waste such as street washings, etc., and industrial wastes and sludges. The total solids content of the sewage in municipal lines is usually about 500 parts per million (p.p.m.) or more. The solids in sewage are mostly animal or vegetable substances, "organic matter", i.e., fats, carbohydrates, and proteins. Some mineral or inorganic constituents present include sand and clay, as well as the common mineral salts found in the water supply. Sewage sludge is obtained from raw sewage and may contain a number of pathogens known to be health hazards to humans. Almost any type of microorganism may be found in sewage, including bacteria, protozoans, viruses and fungi.

Drying of sewage sludge is an important step for preparing a feedstock that is suitable for slurry-making with a sufficiently high solid loadings. In many sewage sludge drying operations, hot gases containing air are used to drive off the moisture. However, it was unexpectedly found that when sewage sludge is dried in the presence of air, it has a lower heating value compared to that dried in an inert atmosphere, e.g. $N_2$. In addition, the sewage sludge prepared in an air atmosphere has a lower solids loading during slurry making. Further, the slurry has a lower stability compared to that prepared with sewage sludge that was dried in a $N_2$ or in an inert atmosphere. The quantity of oxygen present in the combustion flue/hot gases used for drying does not have to be large to induce significant chemisorption of oxygen by the sludge. Air oxidation may introduce oxygen functional groups on the surface of the sewage sludge which can have a significant influence from the standpoint of utilization.

One objective of this invention is to make improved dried sludge by operating the drier in a mode which minimizes the contact between sewage sludge and oxygen at elevated temperatures. Improved slurry fuels (from stability and solids loadings standpoints) are made by using particular gas atmospheres during the drying of the sewage sludge. The absence of oxygen during sludge drying can be achieved by maintaining an inert atmosphere e.g., $N_2$, $Co_2$, $H_2$, $CO$, and mixtures thereof.

Sewage sludge does not behave as a Newtonian fluid. Accordingly, any analyses of sludge flow behavior in pipes is rather difficult. A major problem is the energy (head) loss in sludge transfer due to friction. Sludge slurries with 10–15% concentration can be pumped provided high friction losses are allowable. The physical state of sludge depends upon the amount of moisture present in the sludge and on the nature of the sludge. As the moisture content decreases, the sludge changes state from a true liquid to a semi-solid and ultimately to a dry solid. Through the use of gravity thickening the sludge could approach 3–5% by weight of solids concentration. However, the void spaces between the particles are still filled with water. As the moisture content decreases further, the solids are pushed closer together. The capillary forces continue to increase in the pore structure which progressively decreases the sludge volume. At this point the sludge is considered almost solid (plastic or semi-solid) rather than a liquid. With a further reduction in water content the nature of sludge is changed to such a state that it will not flow under its own weight. Plastic sludges are cohesive in nature due to the surface chemical activity and the bonding properties of the organic and inorganic colloidal materials present.

With landfills closing, ocean dumping being curtailed, and high-technology incinerators becoming unpopular in many areas, communities are finding that it is getting increasingly more difficult and expensive to dispose of their sewage sludge. Pumpable aqueous slurries of sewage sludge are made by the subject process containing high concentrations of sewage sludge. The pumpable slurry may be used as a fuel in a partial oxidation gas generator and may be thereby disposed of without contaminating the atmosphere. After cleaning and removal of undesirable gases e.g. $H_2O$, $H_2S$, $COS$, $CO_2$, a nonpolluting hot raw effluent gas stream comprising at least one of the following is produced: synthesis gas, reducing gas and fuel gas. In one embodiment, the slurry may be burned by complete combustion in a boiler thereby producing by-product steam and hot water. Alternatively, the pumpable slurry may be incinerated or used as fuel in a furnace. Noxious sewage sludge is safely disposed of by the subject process without polluting the nation's environment. Non-contaminating ash and slag are separated from the gas stream. The ash and slag may be used for road bed fill and for making cement blocks. Further, the subject process allows a greater amount of sewage sludge to be fed to a partial oxidation gasifier, boiler, or incinerator while requiring less energy per unit mass of sewage sludge processed.

A typical ultimate analysis of sewage sludge is shown in Table I. A typical ultimate analysis of inert non-combustible materials in sewage sludge is shown in Table II.

TABLE I

| TYPICAL ULTIMATE ANALYSIS OF COMBUSTIBLES IN SEWAGE SLUDGE | |
|---|---|
| ELEMENT | WT. % |
| CARBON | 54.6 |
| HYDROGEN | 7.9 |
| NITROGEN | 4.5 |
| OXYGEN | 32.0 |
| SULFUR | 1.0 |

TABLE II

| TYPICAL ANALYSIS OF INERT NON-COMBUSTIBLE MATERIALS IN SEWAGE SLUDGE | |
|---|---|
| ELEMENT | MG/KG DRY SOLIDS |
| Total Sodium | 1,515 |
| Water Soluble Sodium (mg/l) | 83 |
| Total Potassium | 800 |
| Water Soluble Potassium (mg/l) | 53 |
| Arsenic | 4.58 |
| Beryllium | 0.38 |
| Cadmium | 3.27 |
| Chromium | 244 |
| Copper | 289 |
| Iron | 150 |
| Lead | 147 |
| Zinc | 468 |
| Nickel | 63 |
| Mercury | 0.68 |

The economics of gasifying sewage sludge depend greatly on the tipping fee received from the sludge generating community and the concentration of sewage sludge that can be included in a pumpable slurry destined for the gasifier. Mixtures of sewage sludge containing about 20 to 50 wt. % of solids and liquid hydrocarbonaceous or solid carbonaceous fuel e.g. coal and/or petroleum coke that contain sufficient sewage sludge to be profitably burned are ordinarily too viscous to be pumped. This problem and others have been overcome by the subject invention.

Sewage Sludge is obtained from raw sewage by conventional processing steps and equipment. For example, the sewage from municipal sewage lines is passed through bar screens for the removal of large pieces of stone, wood, metal, and other trash which would clog channels or damage pumps. Coarse heavy inorganic noncombustibles, i.e. gravel, cinders, and sand are then settled out in a grit chamber. The sewage is then separated into an aqueous suspension of sewage sludge and liquids. Concentration of the sewage may be accomplished by any suitable way for separating solids and liquids, e.g. gravity settling, filtration, centrifugation, hydroclone, or a combination thereof. For example, a preferable preliminary procedure is to introduce the screened over-flow from the grit chamber into a primary sedimentation tank such as a continuous clarifier as shown in Perry's Chemical Engineers' Handbook, McGraw-Hill, Fourth Edition, 1963, page 19-50. Detention time in the sedimentation tank is sufficient for producing a pumpable aqueous slurry of primary sludge having a solids content of about 0.5 to 20 wt. %, in about 1 to 24 hours. The primary sedimentation tank may also serve as a hold-up tank to even out discontinuities in the sewage composition. Alternatively, a separate holding tank may be used. In one embodiment, an aqueous slurry of secondary sewage sludge is introduced into the holding tank and mixed with the primary sewage sludge. Secondary sewage sludge has a solids content in the range of about 1 to 10 wt. % and is derived from the liquid overflow from the previously mentioned primary sedimentation tank. The liquid overflow is processed in a conventional manner in order to produce secondary sewage sludge, to reduce the BOD and organic solids content, and to purify and demineralize the waste water which is separated from the secondary sewage sludge. Treatment of the liquid overflow from the primary sedimentation tank may include a combination of any or preferably all of the following steps, depending upon the end use of the water: pH adjustment; reduction of organic solids and BOD to about 20 parts per million or below, preferably by aerated biochemical treatment; clarification, optionally with coagulation; filtration or centrifugation; demineralizing; activated carbon treatment; and disinfection to control bacteria for example by chlorination. Excessively acidic or basic waste waters may be neutralized and the pH adjusted to a level in the range of about 6 to 9. Anaerobic and aerobic biological treatment processes are preferably used to economically abate the bacterial oxygen-consuming pollution caused by the discharge of waste water contaminated with low concentrations of organic matter. Suitable conventional biological processes that may be used include activated sludge units, aerated stabilization basins, and trickling filters. For additional description, see coassigned U.S. Pat. No. 3,687,646, which is incorporated herein by reference.

The water separated from the sewage sludge may be purified by conventional means. The purified water may be then used subsequently in the process. For example, the water may be used as a coolant of the product gas from the partial oxidation gasifier by direct contact in a quench tank or by indirect heat exchange in a waste heat boiler. By-product steam may be produced after dissolved solids are removed. The hot water or steam may be used for indirect heat exchange with other streams in the subject process. For example, the hot water or steam may be used to preheat the aqueous suspension of sewage sludge. Excess water may be discharged from the system or used externally for industrial applications. The sludge underflow from the primary sedimentation tank comprising primary sewage sludge or from the holding tank comprising primary sewage sludge in admixture with secondary sewage sludge having a solids content of at least 3 wt. % is dewatered further to produce an aqueous slurry of sewage sludge having a solids content in the range of about 10 to 50 wt. %. Dewatering may be achieved by conventional means, e.g. filter press, hydroclone, centrifuge.

Preparation of a highly loaded sludge-water slurry with desirable rheological properties requires an understanding of primary sludge characteristics and the relationship of these characteristics to the basic interactions among sludge particles. Since the sludge materials contain numerous chemically active sites, the factors which influence the slurry properties are many.

The dewatered aqueous slurry of sewage sludge having a solids content of about 10 to 50 wt. %, such as about 15 to 25 wt. %, is heated in a drying zone in the absence of free-oxygen containing gas e.g. air, but while in direct contact with a gaseous material selected from the group consisting of $N_2$, $CO_2$, $H_2$, $CO$, and mixtures thereof. By this means the dewatered sewage sludge having a solids content in the range of about 10 to 50 wt. % may be converted into dried sewage sludge having a solids content in the range of about 50 to 99 wt. %. For example, a pumpable aqueous slurry of sewage sludge having a solids content in the range of about 50 to 65 wt. % or non-pumpable dried sewage sludge having a solids content in the range of about 66 to 99 wt. %. The balance being water. The drying zone is maintained at a temperature in the range of about 210° F. to 350° F., such as about 250° F. to 300° F., at a pressure in the range of about 0.5 to 5 atmospheres, such as about 1 to 3 atmospheres, and for a period in the range of about 0.2 to 30 minutes, such as about 0.5 to 2 minutes. The high temperature in the drying zone is provided by the hot gaseous material which is provided at a temperature in the range of about 240° F. to 380° F. The hot gaseous material also provides an inert atmosphere and directly contacts the sewage sludge being dried. Conventional batch and continuous dryers may be used in the drying zone, such as forced-convection tray, film drum drying, spray dryer, rotary dryer, and pneumatic conveying dryer. In one embodiment, at least a portion of the hot effluent gas stream from the partial oxidation gasifier comprising $H_2+CO$ is cooled to a temperature in the range of about 240° to 380° F. and used to dry said aqueous slurry of sewage sludge. Optionally, the sewage sludge may be sheared before, during, or after said drying. For example, shearing may take place in a conventional steam jacketed mixing tank equipped with a high speed propeller. Accordingly, dewatered sewage sludge having a solids content in the range of about 10 to 50 wt. % may be sheared at a temperature in the range of about ambient to 212° F., such as about 180° F. to 212° F., say about 200° F. in a steam jacketed tank for a sufficient period e.g. about 1 to 180 minutes to produce a pumpable homogeneous slurry having a viscosity in the range of about 400 to 2000 centipoise at about 212° F. The propeller rotates at a speed of about 0.5 to 360 rpm thereby providing a shear rate in the range of about 0.5 to 360 seconds$^{-1}$.

Shearing is a very effective way to improve the slurrying characteristics and solids content of dewatered sewage sludge. More extensive shearing of sewage sludge is treated in coassigned U.S. Pat. Nos. 4,933,086 and 4,983,296, which are incorporated herein by reference. Optionally, if necessary the water content of the slurry may be adjusted by removing a small amount. Conventional dewatering equipment, for example evaporators, may be used to remove water and to provide a pumpable aqueous slurry of sewage sludge having a solids content in the range of about 50 to 60 wt. %.

The profit that can be made from the subsequent burning of the pretreated sewage sludge is determined by the percentage of sewage sludge in the feed to the partial oxidation gasifier; or, alternatively in the feed to the furnace, boiler, or incinerator. Gasification of sewage sludge alone is not very efficient, as the heating value of sewage sludge is very low compared to other fuels such as coal and/or liquid hydrocarbonaceous fuel. Mixing the aqueous slurry of sewage sludge with a supplemental fuel selected from the group consisting of a liquid hydrocarbonaceous fuel, solid carbonaceous fuel e.g. coal and/or petroleum coke, and mixtures thereof having a higher heating value of at least 6,000 BTU/LB will improve the overall heating value of the slurry. The coal and/or petroleum coke and the dried sewage sludge may be individually ground or mixed together and ground to a particle size so that 100% passes through an ASTM E11-70 Sieve Designation Standard (SDS) 1.40 mm Alternative No. 14, such as 425 $\mu$m Alternative No. 40. Gasification of such mixtures are thereby rendered highly viable. Accordingly, the solids content of the pretreated aqueous slurry of sewage sludge is increased by mixing with it at least one of the following materials: liquid hydrocarbonaceous fuel, solid carbonaceous fuel-containing material, and mixtures thereof. The solid carbonaceous fuel-containing material is an aqueous slurry of coal and/or petroleum coke having a solids content in the range of about 45 to 80 wt. %; dried coal and/or petroleum coke having a solids content in the range of about 77 to 100 wt. %; and mixtures thereof. The aforesaid liquid hydrocarbonaceous fuel and/or solid carbonaceous fuel-containing material are mixed with the aqueous slurry of dried sewage sludge having a solids content in the range of about 50 to 65 wt. % or the dried sewage sludge having a solids content in the range of about 66 to 99 wt. %. The solids content of the pumpable aqueous slurry of dried sewage sludge is about 50 to 65 wt. %. The parts by weight of supplemental solid carbonaceous fuel and/or liquid hydrocarbonaceous fuel to pumpable slurry of dried sewage sludge are respectively in the range of about 5-7 to 0.5-7. For example, there may be about 6 parts by wt. of solid carbonaceous fuel to 2 parts by wt. of pumpable slurry of dried sewage sludge.

In another embodiment, about 1 to 2 parts by wt. of the sewage sludge dried to a solids content of 50 to 99 wt. % while in an inert atmosphere selected from $N_2$, $CO_2$, $H_2$, $CO$, and mixtures thereof according to the subject process, is mixed with about 1 to 2 parts by wt. of sewage sludge that was dewatered without heating in air and having a solids content in the range of about 10 to 50 wt. %, and about 6 to 8 parts by wt. of said supplemental liquid hydrocarbonaceous and/or solid carbonaceous fuel-containing material to produce a pumpable slurry feedstream having a solids content in the range of about 50 to 65 wt. % and a higher heating value of at least about 6,000 Btu/lb.

The aforesaid materials are mixed together at a temperature in the range of about ambient to 200° F., such as about 150° F. to 195° F. A pumpable slurry of sewage sludge and supplemental fuel is produced having a solids content in the range of about 50 to 65 wt. %, such as about 54 to 60 wt. %, and having a higher heating value of at least about 6000 Btu/lb, such as in the range of about 6,000 to 18,000 BTU/LB, say about 7,000 to 10,000 BTU/LB. Burning said pumpable slurry in a partial oxidation gasifier, furnace, boiler, or incinerator to produce an effluent gas stream.

The term liquid hydrocarbonaceous fuel as used herein is intended to include various liquid hydrocarbon materials, such as those selected from the group consisting of liquified petroleum gas, petroleum distillates and residues, gasoline, naphtha, kerosine, crude petroleum, asphalt, gas oil, residual oil, tar sand oil and shale oil, coal derived oil, aromatic hydrocarbons (such as benzene, toluene, xylene fractions), coal tar, cycle gas oil from fluid-catalytic-cracking operation, furfural extract of coker gas oil, and mixtures thereof. The term solid carbonaceous fuel as used herein is intended to mean a material selected from the group consisting of coal selected from anthracite, bituminous, subbituminous, and lignite; coke from coal; residue derived from coal liquefaction; shale; asphalt; and mixtures thereof. The term "petroleum coke" is used herein in its conventional manner and includes petroleum coke made by conventional delayed or fluid coking processes. The term "and/or" is used herein in its normal sense. For example, "A and/or B" means either A or B, or A and B. Included in the definition of the term "solid carbonaceous fuel" are slurries of coal and/or petroleum coke in a liquid medium selected from the group consisting of water, liquid hydrocarbon, liquid hydrocarbonaceous fuel, and mixtures thereof.

In a preferred embodiment, the fuel feedstream, for example the aqueous slurry of sewage sludge and coal and/or petroleum coke and a stream of free-oxygen containing gas are introduced by means of a burner into a free-flow unobstructed down-flowing vertical refractory lined steel wall pressure vessel where the partial oxidation reaction takes place. A typical gas generator is shown and described in coassigned U.S. Pat. No. 3,544,291, which is incorporated herein by reference. The burner assembly is inserted downward through a top inlet port of the noncatalytic synthesis gas generator. The burner extends along the central longitudinal axis of the gas generator with the downstream end discharging a multiphase mixture of fuel, free-oxygen containing gas, and temperature moderator directly into the reaction zone.

A three or four stream annular type burner, such as shown and described in coassigned U.S. Pat. Nos. 3,847,564 and 4,525,175, which are incorporated herein by reference, may be used to introduce the feedstreams into the partial oxidation gas generator. For example, with respect to FIG. 2 of U.S. Pat. No. 3,847,564, free-oxygen containing gas may be simultaneously passed through the central conduit 18 and outer annular passage 14 of said burner. The free-oxygen containing gas is selected from the group consisting of substantially pure oxygen i.e. greater than 95 mole % $O_2$, oxygen-enriched air i.e. greater than 21 mole % $O_2$, and air. The free-oxygen containing gas is supplied at a temperature in the range of about 100.F to 1000.F. The aqueous slurry of pretreated sewage sludge and liquid hydrocarbonaceous fuel and/or solid carbonaceous fuel e.g. coal and/or petroleum coke is passed simultaneously through the intermediate annular passage 16 at a temperature in the range of about ambient to 650° F.

In the partial oxidation process, the weight ratio of $H_2O$ to carbon in the feed is in the range of about 0.2 to 3.0, such as about 1.0 to 2.0. The atomic ratio of free-oxygen to carbon in the feed is in the range of about 0.85 to 1.5, such as about 1.0 to 1.2. Advantageously, the high amount of combined oxygen in the sewage sludge reduces the amount of free-oxygen containing gas required.

The relative proportions of solid or liquid fuels, water and oxygen in the feedstreams to the partial oxidation gas generator are carefully regulated to convert a substantial portion of the carbon in the fuel e.g., up to about 90% or more by weight, to carbon oxides; and to maintain an autogenous reaction zone temperature in the range of about 1800° F. to 3500° F. The pressure is in the range of about 1–35 atmospheres. Preferably the temperature in the gasifier is in the range of about 2200° F. to 2800° F., so that molten slag is produced.

The dwell time in the reaction zone is in the range of about 1 to 10 seconds, and preferably in the range of about 2 to 8 seconds. With substantially pure oxygen feed to the partial oxidation gas generator, the composition of the effluent gas from the gas generator in mole % dry basis may be as follows: $H_2$ 10 to 60, CO 20 to 60, $CO_2$ 5 to 40, $CH_4$ 0.01 to 5 $H_2S+COS$ nil to 5, $N_2$ nil to 5, and Ar nil to 1.5. With air feed to the gas generator, the composition of the generator effluent gas in mole % dry basis may be about as follows: $H_2$ 2 to 20, CO 5 to 35, $CO_2$ 5 to 25, $CH_4$ nil to 2, 1 $H_2S+COS$ nil to 3, $N_2$ 45 to 80, and Ar 0.5 to 1.5. Unconverted carbon, ash, or molten slag are contained in the effluent gas stream. Depending on the composition and use, the effluent gas stream from the partial oxidation gasifier is called synthesis gas, reducing gas, or fuel gas. Coal has a high ash content e.g. about 10 to 30 wt. %. Advantageously, when coal is used as the supplemental fuel the coal ash will encapsulate the non-combustible materials in the sewage sludge, and the encapsulated material will flow from the reaction zone of the gas generator as substantially inert molten slag.

The hot gaseous effluent stream from the reaction zone of the synthesis gas generator is quickly cooled below the reaction temperature to a temperature in the range of about 250° F. to 700° F. by direct quenching in water, or by indirect heat exchange for example with water to produce steam in a gas cooler. The gas stream from the partial oxidation gasifier or the flue gas from the furnace, boiler, or incinerator may be cleaned and purified by conventional methods. For example, reference is made to coassigned U.S. Pat. No. 4,052,176, which is included herein by reference for removal of $H_2S$, COS, and $CO_2$. Fly-ash and slag maybe removed by quenching the process gas stream in a conventional quench tank and/or by scrubbing. See coassigned U.S. Pat. Nos. 3,232,728; 3,524,630; and 4,801,307, which are incorporated herein by reference.

EXAMPLES

The following examples are submitted for illustrative purposes only, and it should not be construed that the invention is restricted thereto.

Two separate sets of samples of L. A. County Sewage Sludge having a solids content of about 20 wt. % were dried at 100° C. for two days to a solids content of about 97 wt. %. One set of samples were dried in air and the other set was dried in a nitrogen atmosphere. Pumpable aqueous slurries were prepared from the air dried samples and also from the nitrogen dried samples of sewage sludge. The apparent viscosity of the aqueous slurry of L.A. County sewage sludge in centipose vs. wt. % solids in the slurry of sewage sludge is shown in Table III. The aqueous slurries were made from (1) air dried sewage sludge; and (2) sewage sludge dried in the nitrogen atmosphere.

TABLE III

VISCOSITY OF PUMPABLE AQUEOUS SLURRIES OF L.A. COUNTY SEWAGE SLUDGE
Dried in Air vs. Dried in Nitrogen

| Apparent Viscosity Centipoise | Air Dried Sewage Sludge Wt. % Solids | Nitrogen Dried Sewage Sludge Wt. % Solids |
|---|---|---|
| 750 | 48.5 | 51.0 |
| 1000 | 48.6 | 51.6 |
| 1500 | 49.6 | 52.5 |
| 1750 | 50.4 | 52.6 |

The results as shown in Table III demonstrate that drying conditions will influence the slurryability of the product sludge. The overall solids loading for a slurry prepared using the L.A. County sludge is reduced as a result of air oxidation. Furthermore, it was demonstrated that the stability of aqueous slurries of air dried sewage sludge was substantially less than that of aqueous slurries of sewage sludge that was dried in a nitrogen atmosphere.

To demonstrate the influence of thermal-treatment of sewage sludge on sludge structure, in general, and on oxygen functional groups in particular, raw and heat-treated samples of sewage sludge were characterized by Fourier Transform Infrared Spectroscopy (FTIR). For each sample, two KBr pellets were made containing roughly 1 mg of dry ground sample and 30 mg of KBr. A comparison of the two spectra (between 400 and 4000 $cm^{-1}$ wavelength region) for each of the two samples indicates reasonable agreement in sample preparation. Comparisons of the mineral matter and baseline corrected spectra for the two samples (raw and heat-treated) were made. The dry-mineral-matter-free (dmmf in weight units) of the organic functional groups were generated by applying a spectral synthesis routine to the dry baseline and mineral matter corrected spectra. The synthesis routine also quantitates the relative peak areas based on the intensity of known model compounds. The carbonyl values provided are indications of relative peak areas (in units of absorbance x $cm.^{-1}$). The results indicate that the treatment of sewage sludge in an oxidizing atmosphere induces the following changes in the sewage sludge structure:

A significant increase in the phenolic OH functional groups (from 7.5 to 8 wt % dmmf).
A significant increase in the other oxygen content (from 2.8 to 4 wt. % dmmf).
A significant increase in the carbonyl functional groups.
A decrease in the aromatic hydrogen.
A small decrease in the aliphatic carbon content of the sludge.

The results of ultimate analyses demonstrate that the sewage sludge dried in the air atmosphere has a lower amount of hydrogen and carbon compared to that prepared in an inert atmosphere. Air drying of sludge results in a loss of carbon and hydrogen by the formation of $CO_2$ and $H_2O$. The heating value of the air dried sludge is significantly (about 10%) lower than the sewage sludge prepared in an inert atmosphere.

Although modifications and variations of the invention may be made without departing from the spirit and scope thereof, only such limitations should be imposed as are indicated in the appended claims.

I claim:

1. A process for burning sanitary sewage sludge comprising:
    (1) dewatering without heating in air an aqueous slurry of sewage sludge to produce an aqueous slurry of sewage sludge having a solids content in the range of about 10 to 50 wt. %, thereafter shearing the dewatered slurry of sewage sludge in a steam jacketed tank for a period of about 1 to 180 minutes to produce a pumpable homogenous slurry of sewage sludge having a viscosity in the range of about 400 to 2000 centipoise at a temperature of about 212° F.;
    (2) drying the homogenous slurry of sewage sludge from (1) to a solids content in the range of about 50 to 99 wt. % in a drying zone in the absence of a free-oxygen containing gas but while in direct contact with a gaseous material selected from the group consisting of $N_2$, $CO_2$, $H_2$, CO, and mixtures thereof; wherein said drying zone is at a temperature in the range of about 210° F. to 350° F. and a pressure in the range of about 0.5 to 5 atmosphere;
    (3) mixing about 0.5 to 7 parts by wt. of said dried sewage sludge from (2) with about 5 to 7 parts by wt. of at least one supplementary fuel from the group consisting of solid carbonaceous fuel, liquid hydrocarbonaceous fuel, mixtures thereof, and with or without water to produce a pumpable slurry fuel feedstream having a solids content in the range of about 50 to 65 wt. % and a higher heating value of at least about 6000 BTU/lb; and
    (4) burning said pumpable slurry from (3) in a partial oxidation gasifier, furnace, boiler, or incinerator to produce an effluent gas stream.

2. The process of claim 1 provided with the steps of washing and purifying the effluent gas stream from (4) and separating unwanted gases, non-polluting ash and slag.

3. The process of claim 1 where in (4) said pumpable slurry from (3) is burned in a partial oxidation gasifier with a free-oxygen containing gas at a temperature in the range of about 1800° F. to 3500° F., a pressure in the range of about 1 to 35 atmospheres, a weight ratio of $H_2O$ to carbon in the feed in the range of about 0.2 to 3.0, and an atomic ratio of free-oxygen to carbon in the range of about 0.85 to 1.5 to produce an effluent gas stream of synthesis gas, reducing gas or fuel gas.

4. The process of claim 3 wherein said effluent gas stream comprises $H_2$+CO, and provided with the steps of partially cooling at least a portion of said effluent gas stream to a temperature in the range of about 240° to 380° F., and drying said sewage sludge in (2) in contact with said partially cooled effluent gas stream.

5. The process of claim 1 wherein said solid carbonaceous fuel is selected from the group consisting of anthracite, bituminous, subbituminous, and lignite; coke from coal; petroleum coke; residue derived from coal liquefaction; shale, and mixtures thereof.

6. The process of claim 1 wherein said solid carbonaceous fuel is provided as a pumpable slurry of coal and/or petroleum coke in a liquid medium selected from the group consisting of water, liquid hydrocarbon, liquid hydrocarbonaceous fuel, and mixtures thereof.

7. The process of claim 1 wherein said liquid hydrocarbonaceous fuel is selected from the group consisting of liquified petroleum gas, petroleum distillates and residues, gasoline, naphtha, kerosine, crude petroleum, asphalt, gas oil, residual oil, tar sand oil and shale oil, coal derived oil, aromatic hydrocarbons, benzene, toluene, xylene fractions, coal tar, cycle gas oil from fluid-catalytic-cracking operation, furfural extract of coker gas oil, and mixtures thereof.

8. The process of claim 1 provided with the steps of introducing said pumpable slurry fuel feedstream from (3) into the reaction zone of a partial oxidation gas generator by way of the intermediate passage of a three-passage annular-type burner comprising a central conduit and intermediate and outer coaxial concentric annular passages; and impacting, atomizing, and reacting by partial oxidation said slurry fuel feedstream in said reaction zone with free-oxygen containing gas streams which are passed simultaneously through the central conduit and outer annular passage of said burner.

* * * * *